United States Patent [19]
Maxwell

[11] Patent Number: 6,106,571
[45] Date of Patent: Aug. 22, 2000

[54] RELOCATABLE INSTRUMENTATION TAGS FOR TESTING AND DEBUGGING A COMPUTER PROGRAM

[75] Inventor: Sidney R. Maxwell, Bothell, Wash.

[73] Assignee: Applied Microsystems Corporation, Redmond, Wash.

[21] Appl. No.: 09/015,256

[22] Filed: Jan. 29, 1998

[51] Int. Cl.[7] ...................................................... G06F 9/45
[52] U.S. Cl. ........................................ 717/4; 717/5; 717/6
[58] Field of Search .................................... 395/704, 705; 364/148.01; 714/38; 717/5, 6, 11

[56] References Cited

U.S. PATENT DOCUMENTS

| | | | |
|---|---|---|---|
| 4,144,493 | 3/1979 | Lee et al. | 324/158 R |
| 4,445,192 | 4/1984 | Haag et al. | 364/900 |
| 4,590,581 | 5/1986 | Widdoes, Jr. | 364/578 |
| 4,720,778 | 1/1988 | Hall et al. | 364/200 |
| 4,811,345 | 3/1989 | Johnson | 371/16 |
| 4,819,233 | 4/1989 | Delucia et al. | 371/19 |
| 4,845,615 | 7/1989 | Blasciak | 364/200 |
| 4,849,879 | 7/1989 | Chinnaswamy et al. | 364/200 |
| 4,864,569 | 9/1989 | DeLucia et al. | 371/19 |
| 4,866,665 | 9/1989 | Haswell Smith | 714/35 |
| 4,937,740 | 6/1990 | Agarwal et al. | 364/200 |
| 4,969,148 | 11/1990 | Nadeau-Dostie et al. | 371/21.1 |
| 4,989,134 | 1/1991 | Shaw | 364/200 |
| 5,006,992 | 4/1991 | Skeirik | 364/513 |
| 5,047,919 | 9/1991 | Sterling et al. | 364/200 |
| 5,062,055 | 10/1991 | Chinnaswamy et al. | 364/513 |
| 5,103,394 | 4/1992 | Blasciak | 395/575 |
| 5,121,489 | 6/1992 | Andrews | 714/38 |

(List continued on next page.)

FOREIGN PATENT DOCUMENTS 0 567 722 A2  11/1993  European Pat. Off. ........ G06F 11/00

OTHER PUBLICATIONS

Potkonjak et al, "Design for debugging of application specific design", Pro. of IEEE/ACM Int. Conf. CAD, pp. 295–301, Nov. 1995.

Wahl et al, "A paradigm for distributed debugging", ACM pp. 235–242, Apr. 1992.
Wahlbe et al, "Practical data breakpoints: design and implementation", ACM SIGPLAN PLDI, pp. 1–12, Apr. 1993.
Bourdoncle, "Abstract debugging of high oerder imperative languages", ACM SIGPLAN PLDI, pp. 46–55, Apr. 1993
Fritzson et al., "Generalized algorithmic debugging and testing", ACM SIGPLAN PLDI pp. 317–326, Jul. 1991.
Robert Morgan, "Building an optimizing compiler", Butterworth Heinemann Pub., pp. 152–164, 1998
Yingsha. Liao et al., "A Specificational Approach to High Level Program Monitoring and Measuring", IEEE Transactions on Software Engineering, vol. 18, No. 11, Nov. 1992, pp. 969–978.
Yan, Jerry C., "Performance Tuning with AIMS—An Automated Instrumentation and Monitoring System for Multicomputers", 1994, Annual Hawaii International Conference on System Sciences, pp. 625–633.
Crooks, Roger "Embedded RISC μPs Present New Debugging Challenges," *EDN*, 39(16):105–112, Aug. 4, 1994.

*Primary Examiner*—Eric W. Stamber
*Assistant Examiner*—Anil Khatri
*Attorney, Agent, or Firm*—David V. Carlson; Seed IP Law Group PLLC

[57] ABSTRACT

A method and apparatus for producing a plurality of unique instrumentation tags for testing and debugging a computer program. The tags have a value equal to the combination of an offset and a base. The value for a tag offset is first determined. The tag is then inserted into an area of interest within the source code being instrumented. The base value is set when the object code for the computer program is linked to form executable code. The base value is resolved such that each tag has a unique value in comparison with any other tag. The source code being instrumented with tagging statements can reside on more than one computer. Moreover, the instrumented source code can be compiled on more than one computer. The unique value associated with each tagging statement is recorded in an instrumentation database, which facilitates observation of the instrumented program during its execution.

17 Claims, 10 Drawing Sheets

U.S. PATENT DOCUMENTS

| | | | |
|---|---|---|---|
| 5,121,501 | 6/1992 | Baumgartner et al. | 395/800 |
| 5,134,701 | 7/1992 | Mueller et al. | 395/500 |
| 5,136,590 | 8/1992 | Polstra et al. | 371/16.2 |
| 5,259,766 | 11/1993 | Sack et al. | 434/362 |
| 5,265,254 | 11/1993 | Blasciak et al. | 395/704 |
| 5,307,498 | 4/1994 | Eisen et al. | 395/704 |
| 5,321,828 | 6/1994 | Phillips et al. | 395/500 |
| 5,329,471 | 7/1994 | Swoboda et al. | 364/578 |
| 5,353,315 | 10/1994 | Scarola et al. | 376/259 |
| 5,355,369 | 10/1994 | Greenberger et al. | 371/22.3 |
| 5,361,351 | 11/1994 | Lenkov et al. | 717/4 |
| 5,367,683 | 11/1994 | Brett | 717/9 |
| 5,371,878 | 12/1994 | Coker | 395/500 |
| 5,408,650 | 4/1995 | Arsenault | 395/575 |
| 5,410,685 | 4/1995 | Banda et al. | 714/38 |
| 5,450,586 | 9/1995 | Kuzara et al. | 394/704 |
| 5,533,192 | 7/1996 | Hawley et al. | 714/28 |
| 5,539,907 | 7/1996 | Srivastava et al. | 395/700 |
| 5,553,286 | 9/1996 | Lee et al. | 717/5 |
| 5,828,884 | 9/1996 | Lee et al. | 717/5 |
| 5,956,512 | 9/1999 | Simmons et al. | 717/5 |

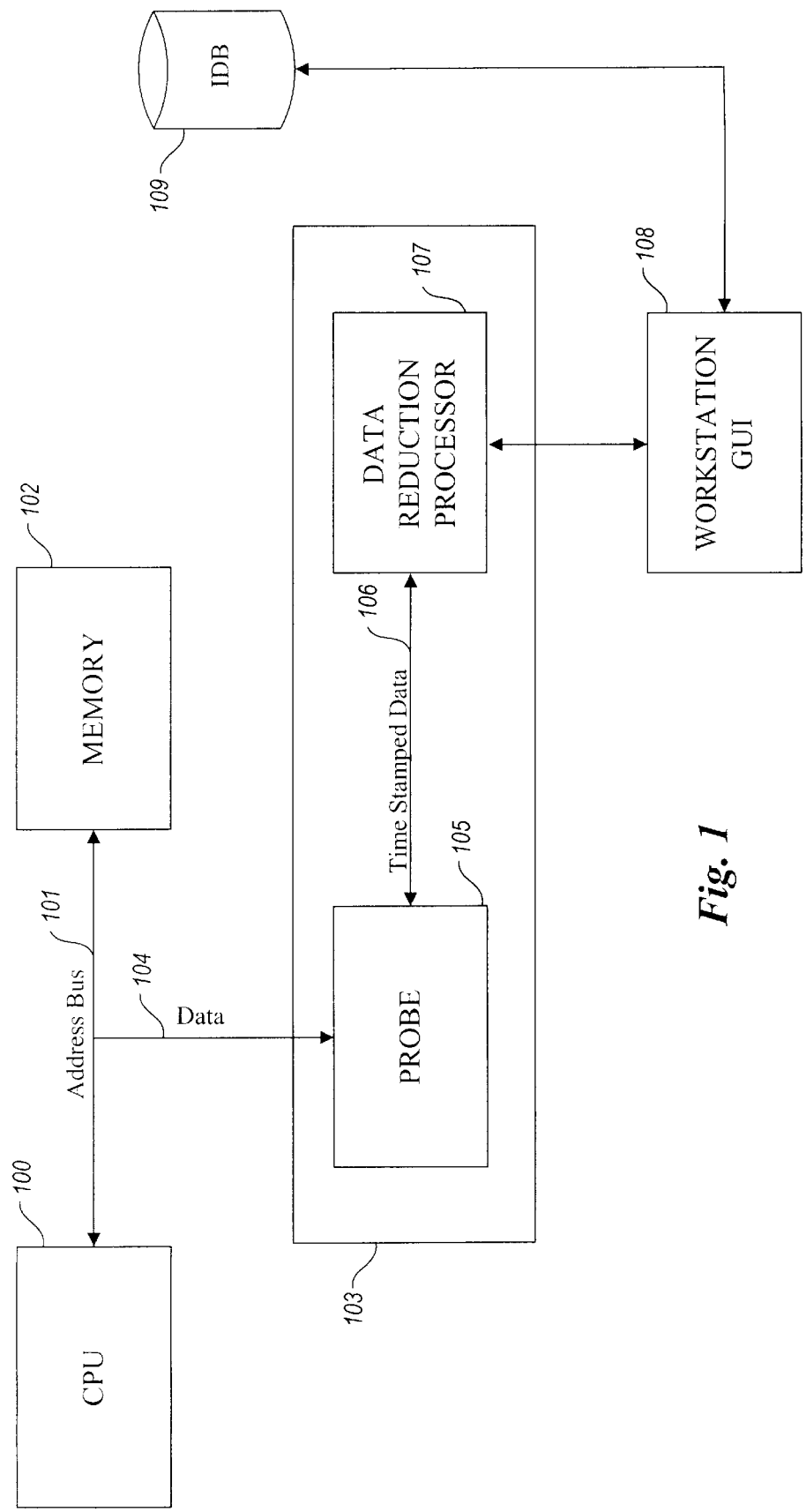

RELOCATABLE INSTRUMENTATION TAGS FOR TESTING AND DEBUGGING A COMPUTER PROGRAM

TECHNICAL FIELD

The present invention relates to the instrumentation of a computer program for testing and debugging, and more particularly to the instrumentation of a computer program with tagging statements.

BACKGROUND OF THE INVENTION

The software development process typically consists of the independent production of numerous source code modules which collectively constitute a complete computer program. The source code modules are then compiled and linked together to form an executable computer program. Since multiple software developers may have written one or more of these source code modules, the source code modules or the compiled versions typically need to be transferred to a single computer for linking. Once the executable computer program has been generated, the software developer can test and debug the computer program using standard testing and debugging techniques.

Because of the sheer number of source code modules, the resulting computer program is often extremely complex. Testing and then debugging computer programs are important steps in any software development process, and these steps become even more important for complex computer programs. Indeed, such debugging (i.e., correcting any errors) may even constitute a contractual requirement before acceptance by the computer program's intended users. Not surprisingly, the difficulty of testing and debugging computer programs generally increases as complexity increases. In addition, the difficulty in testing a complex computer program often increases as the number of software developers increases.

When testing a computer program, a software developer typically needs to ensure that each source code module independently performs its intended function correctly and that the computer program comprising all the source code modules also performs its intended function correctly. To properly debug a computer program, a software developer typically needs to trace the execution of the computer program. A trace of the execution indicates exactly which steps in the computer program have been executed and the order in which they were executed. The tracing of the execution of a computer program can be performed by instrumenting the source code modules.

Source code instrumentation typically consists of inserting an executable tagging assignment statement, or "tag," into a source code module of a computer program at various tagging points prior to compiling the source code module. Tagging points are places of interest in the source code module, such as entry or exit from a function, the alternative branches of a selection statement, and execution of a loop statement, where a software developer may want to know the state of the computer program as it executes. At each tagging point, the tagging assignment statement typically assigns a unique value to a tagging variable. An instrumentation database ("IDB") holds data regarding the tagging point, such as the tagging value assigned to the tagging variable at each tagging point and information about the source code module at the tagging point.

A software developer can then execute the instrumented computer program and monitor the current value of the tagging variable to trace the execution of the computer program. The tagging values produced during computer program execution can be saved to provide a trace of the execution of the computer program. Following execution of the computer program, these tagging values provide references for identifying the tagging points in the computer program. Thus, the tags serve as a means for indicating execution of a particular fragment of the computer program.

Instrumentation can typically be accomplished using the "by address" or "by value" schemes. In an instrumentation by address scheme, a unique memory location with a unique address is set aside for each tagging point and the tagging statement stores a tagging value in its unique location. For example, a single tagging value can be used, and if this tagging value is written to a unique location, then the software developer can infer that a corresponding tagging point in the computer program has been executed. In an instrumentation by value scheme, different tagging values are written to a single memory location, and the tagging value written to that location, rather than the location itself, corresponds to a particular tagging point in the computer program. Specialized probes typically intercept these tagging values and write them to a file which can be examined by the software developer and used as a tool for debugging the computer program.

Table 1 provides an example of a source code module prior to its instrumentation with tags. Source code module 1, shown in Table 1, contains pseudocode for two variable assignment statements to variable "A" (ln. 4 and ln. 8), a "while" loop (ln. 5), a function call (ln. 7), and an "if-then-else" statement (lns. 10–16). Source code module 1 contains no tags, and its executable code would not emit tagging values (i.e., execute tagging assignment statements). Thus, the software developer will not have access to a reference table of emitted tagging values for source code module 1 to determine, for example, that "function_1" (ln. 7) had been executed by this source code module.

TABLE 1

| | Source Code Module 1 |
|---|---|
| 1. | |
| 2. | |
| 3. | { |
| 4. | A = 0; |
| 5. | while A ≧ 0 |
| 6. | { |
| 7. | function_1 (A,B); |
| 8. | A = A + B; |
| 9. | } |
| 10. | if A > 10 |
| 11. | then |
| 12. | { . . . |
| 13. | } |
| 14. | else |
| 15. | { . . . |
| 16. | } |
| 17. | . |
| 18. | . |
| 19. | . |
| 20. | } |

Table 2 provides an example of source code module 1 following its instrumentation with tags in an instrumentation by value scheme. An instrumenter has inserted a declaration for a tagging variable, "AMC_Control_Port" (ln. 2), in source code module 1. (In an instrumentation by address scheme, the instrumenter would typically insert declarations for multiple tagging variables.) The instrumenter has also inserted tagging assignment statements at various tagging points (lns. 7, 11, 15, 19, 21, and 25) within source code module 1, which contains the pseudocode previously shown in Table 1. An executable computer program containing instrumented source code module 1 will emit tags during execution. Thus, a software developer may reference a table of emitted tagging values to determine which steps from source code module 1 have been executed. For example, a software developer may ascertain whether "function_1" (ln. 8) in source code module 1 has been executed by determining whether a tagging variable having a value of "0" (ln. 7) has been stored in the table of emitted tagging values. If a "0" has been stored, then the software developer may infer that "function_1" has been executed, and if a "0" has not been stored, then the software developer may infer that "function_1" has not been executed.

TABLE 2

| | |
|---|---|
| 1. | Instrumented Source Code Module 1 |
| 2. | external volatile unsigned long AMC_Control_Port; |
| 3. | { |
| 4. |   A = 0; |
| 5. |   while (A ≧ 0) |
| 6. |   { |
| 7. |     AMC_Control_Port = 0; |
| 8. |     function_1 (A,B); |
| 9. |     A = A + B; |
| 10. |   } |
| 11. |   AMC_Control_Port = 1; |
| 12. |   if (A > 10) |
| 13. |     then |
| 14. |     { |
| 15. |       AMC_Control_Port = 2; |
| 16. |     } |
| 17. |     else |
| 18. |     { |
| 19. |       AMC_Control_Port = 3; |
| 20. |     } |
| 21. |   AMC_Control_Port = 4; |
| 22. |   . |
| 23. |   . |
| 24. |   . |
| 25. |   AMC_Control_Port = 9; |
| 26. | } |

FIG. 1 illustrates a typical monitoring system associated with a source code instrumentation by value scheme. Once a computer program has been instrumented with tagging assignment statements, specialized testing equipment monitors execution of the computer program. As the computer program executes within CPU 100, specialized hardware 103 detects writes to particular locations in memory 102. In the instrumentation by value scheme, this specialized hardware knows the address of the tagging variable. As the computer program executes, data passes between the CPU and the memory through address and data bus 101. Probe 105 monitors the address bus and looks for the occurrence of the writing of data to the address location of the tagging variable. When the probe detects a write to the tagging variable, the probe copies the tagging value from the data bus connection 104. The probe then appends a time stamp to the tagging value before passing the tagging value to a data reduction processor 107 through connection 106. The data reduction processor identifies certain tagging points as requiring additional processing. For example, the data reduction processor pairs function entry and exit tagging values so that the difference in time stamps may be calculated to determine the amount of time spent during the execution of the respective function. The data reduction processor then prepares a report which may include a list of tagging values and their respective time stamps, a list of executed functions identified by tagging values along with "performance" statistics, and a compressed list of executed tagging values to indicate their execution, (e.g., a "coverage map"). The report may also contain other information. The data reduction processor forwards this report to a workstation which provides the report to a graphical user interface ("GUI") 108. The GUI 108 identifies the tagging points corresponding to the tagging values, found in the report from the data reduction processor, using the data stored in the IDB 109. The GUI 108 then prepares any of several reports, which may include additional information besides the identification of the tagging points to indicate the flow of execution. Additional information frequently appended to each reported tagging point includes the name of the source code module from which the tagging assignment statement has been executed, the line numbers for the start and the end of the function containing the tagging assignment statement, and other information identifying the nature of the tagging point. A software developer monitors the execution trace report from the GUI to determine whether the computer program operates within expected parameters.

In order for a computer program to emit tagging values during execution, the computer program must first be fitted with tagging assignment statements. An instrumenter typically inserts tagging assignment statements into the source code modules of a computer program during an instrumentation pass which occurs before the source code modules are compiled. When using a tagging by value scheme, the tagging assignment statement normally has a simple form such as "AMC_control_port=0×12345678" where the monitored tagging variable "AMC_control_port" is assigned a unique tagging value "0×12345678." FIG. 2A shows an example tagging value format 201. In this example, the value is a 32-bit integer. During the instrumentation pass, the instrumenter records pertinent information about the location of each of the inserted tags which can be subsequently used to interpret the computer program's behavior during execution. As described above, a probe monitors the address to which the tagging variable is written. For example, if a particular tag represents entry into a function called "read_data," then if at run-time the computer program emits the particular tagging value assigned by this tag, a software developer can deduce that the computer program has executed at statement at the entry to the function "read_data."

In conventional instrumentation schemes, the source code modules representing the computer program are first pre-processed by a compiler pre-processor. The pre-processor expands macros, removes comments, and expands include files. The instrumenter then takes these pre-processed source code modules and adds the tagging assignment statements. The compiler produces object code from the instrumented source code modules, and a linker then combines the object code to form executable code.

When all the source code modules of a computer program are instrumented at the same time, the instrumenter can assign a unique tagging value to each tagging point. However, if the various source code modules are instrumented and compiled at different times (e.g., by different software developers), then a problem occurs. In particular, the instrumenter may assign the same tagging value at two different tagging points. As a result, when the computer program emits this tagging value, since it does not uniquely identify a tagging point, the software developer may have difficulty tracing the flow of execution.

Table 3A depicts the instrumented source code module 1, previously shown in Table 2, and Table 3B depicts instrumented source code module 2. Both of these source code modules have been instrumented without regard for the tagging values assigned to the other, such as might occur due to instrumentation at different time periods. Hence, if a computer program containing both of these source code modules emits a tag having a value of "0" during execution, for example, the software developer will not know whether the program has executed the call to function_1 (ln. 8) of source code module 1 or whether the program has executed the "if" statement (ln. 6) of source code module 2. Indeed, source code module 1 shares ten tagging values with source code module 2. Thus, no tag emitted during execution of the computer program could be confirmed to have originated in source code module 1, and only the tags in source code module 2 following the tenth tag would emit unique values.

TABLE 3A

| | |
|---|---|
| 1. | Instrumented Source Code Module 1 |
| 2. | external volatile unsigned long AMC_Control_Port; |
| 3. | { |
| 4. |   A = 0; |
| 5. |   while (A ≧ 0) |
| 6. |   { |
| 7. |     AMC_Control_Port = 0; |
| 8. |     function_1 (A,B); |
| 9. |     A = A + B; |
| 10. |   } |
| 11. |   AMC_Control_Port = 1; |
| 12. |   if (A > 10) |
| 13. |     then |
| 14. |     { |
| 15. |       AMC_Control_Port = 2; |
| 16. |     } |
| 17. |     else |
| 18. |     { |
| 19. |       AMC_Control_Port = 3; |
| 20. |     } |
| 21. |   AMC_Control_Port = 4; |
| 22. |   . |
| 23. |   . |
| 24. |   . |
| 25. |   AMC_Control_Port = 9; |
| 26. | } |

TABLE 3B

| | |
|---|---|
| 1. | Instrumented Source Code Module 2 |
| 2. | external volatile unsigned long AMC_Control_Port; |
| 3. | { |
| 4. |   A = X + 12; |
| 5. |   AMC_Control_Port = 0; |
| 6. |   if (A ≦ 12) |
| 7. |     then |
| 8. |     { |
| 9. |       AMC_Control_Port = 1; |
| 10. |       A = A − 10; |
| 11. |     } |
| 12. |   else |
| 13. |   { |
| 14. |     AMC_Control_Port = 2; |
| 15. |   } |
| 16. |   AMC_Control_Port = 3; |
| 17. |   . |
| 18. |   . |
| 19. |   . |
| 20. |   AMC_Control_Port = 9; |
| 23. | |
| 22. |   . |
| 23. |   . |
| 24. |   . |
| 25. |   AMC_Control_Port = 11; |
| 26. | } |

Some instrumenters provide methods for referring to IDBs produced for source code modules from earlier versions of the computer program which will also be used in the version of the computer program about to be produced. If a source code module has not changed since the previous version of the computer program, then the instrumentation process proceeds more efficiently by not re-instrumenting those source code modules which have not changed. However, care must be taken to ensure that the tagging values assigned in the instrumentation procedure for the new version of the computer program do not conflict with the tagging values assigned in an earlier version of the computer program which will also be used in the new version of the computer program.

Some conventional systems do support this more efficient incremental instrumentation procedure suggested above. In this approach, if only one source code module has changed, then only that source code module needs to be re-instrumented and compiled before relinking the entire computer program. However, these conventional systems suffer from a limitation which requires the software developers to direct the instrumenter to the set of IDBs which contain all the tagging values assigned up to this point in the development cycle. For centralized compiling environments where a configuration manager coordinates control of the source code modules in conjunction with the software developers, this requirement may not be too restrictive. Software developers in such centralized environments presumably enjoy a controlled procedure for locating particular versions of source code modules, object code files, and IDBs, so identifying the IDBs from an earlier version of the computer program is relatively simple. However, this mechanism breaks down in the large de-centralized environments which are typical of many modern software development projects. Disparate groups of software developers may each be responsible for the construction of dynamic linked libraries or compiled libraries of object code used by many projects, or for various groups of software developers from the same project. With no centralized control over the production of new versions of the computer program, each of these libraries may be instrumented independently, leading to conflicts in the tagging values that are assigned by the instrumenter. At run time, these conflicting tagging values confuse the analysis process because an identical tagging value may point to multiple source code modules, and the computer program monitoring tool does not know which tagging values represent which source code module.

Moreover, the centralized compile model does not support the parallel production of versions of the computer program. Modern software projects are frequently so large that it is impractical to compile and link the entire computer program on one machine. In a networked environment, the compiling process may be distributed to many machines so that they can compile the source code modules in parallel, completing the compilation in a fraction of time, typically 1/nth of the time where n is the number of machines involved. Thus, if a version of the computer program consists of 1,000 source code modules where 100 of the source code modules are compiled on ten machines, the developer requires that instrumentation also takes place on each of the ten machines where compilation occurs. If resolution of the tagging values is not properly coordinated among these machines, the resulting computer program will contain countless conflicts in the tagging values which have been inserted into the various source code modules.

SUMMARY OF THE INVENTION

An embodiment of the present invention provides a method and system for instrumenting with tagging assignment statements a computer program having a plurality of source code modules. A unique value for the tagging variable in each tagging assignment statement results from assigning the tagging variable a value equal to the combination of an offset value and a base value. An offset tagging instrumenter of the present invention generates a unique base variable for each source code module to be instrumented with tagging assignment statements. The offset tagging instrumenter then examines the source code module and inserts tagging assignment statements at instrumentation points. The inserted tagging assignment statements set the tagging variable equal to the combination of an offset value and the generated base variable for that source code module. The offset tagging instrumenter generates a unique offset value for each tagging assignment statement in a source code module. A compiler produces object code modules from the instrumented source code modules. A base value resolver generates source code statements assigning a unique value for each generated base variable such that each combination of generated offset values and values of generated base variables uniquely identifies each instrumentation point. A compiler compiles the generated source code statements. A linker links the compiled instrumented source code modules with the compiled generated source code statements to form a linked program so that during execution of the linked program the tagging variable is set to a unique value at each instrumentation point. Because the determination of the base value for each generated base variable is deferred until link time, the base value resolver can ensure that each tagging assignment statement in each module sets the tagging variable to a value that is unique across all linked modules.

BRIEF DESCRIPTION OF THE DRAWINGS

FIG. 1 illustrates a typical monitoring system associated with an instrumented tagging scheme for software testing and debugging.

DETAILED DESCRIPTION OF THE INVENTION

An exemplary embodiment of the present invention provides an instrumentation tagging method and apparatus which supports parallel instrumentation by tagging on a plurality of computers. Embodiments of the present invention provide an offset tagging instrumenter which permits instrumentation of one or more changed source code modules without creating a danger of tagging value conflicts with previously instrumented source code modules or with source code modules instrumented on different computer systems. Modification of the conventional tagging assignment statement enables these expanded instrumentation capabilities.

The offset tagging instrumenter ensures that each tagging point will have a unique tagging value by deferring the actual associating of tagging value to tagging points until execution of the instrumented program. The offset tagging instrumenter employs tagging assignment statements which combine a tagging base variable and a tagging offset value to form a tagging value for a tagging variable. Each source code module has a unique tagging base variable, and each tagging point has a tagging offset value that is unique within the source code module. At instrumentation time, the offset tagging instrumenter inserts tagging assignment statements that combine a constant tagging offset value with the base variable for the source code module. At link time, a tagging base value resolver generates a unique base value for each tagging base variable so that each tagging assignment statement generates a unique tagging value. The tagging base value resolver then effects the initialization of each tagging base variable to its unique value. At run time, when the tagging assignment statement is executed, the value assigned the tagging base variable of the source code module is combined with the constant tagging offset value assigned to the tagging assignment statement to form a tagging value that is unique across all modules. The tagging variable is then set equal to the unique tagging value. In this way, source code modules that are instrumented at different times can be linked together without conflict in the tagging values. These tagging assignment statements are referred to as link-time "relocatable"because the range of tagging values assigned to a particular statement may change at link time.

Figure 2A:
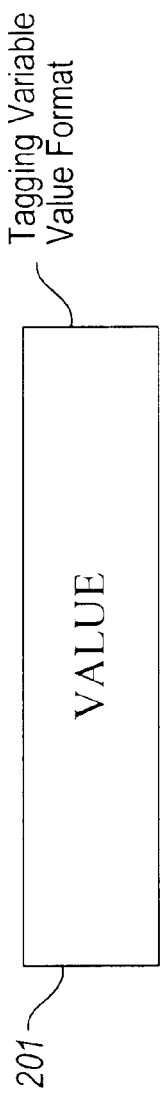
FIG. 2A illustrates a conventional tagging value which is inserted in the instrumentation database.
Figure 2B:
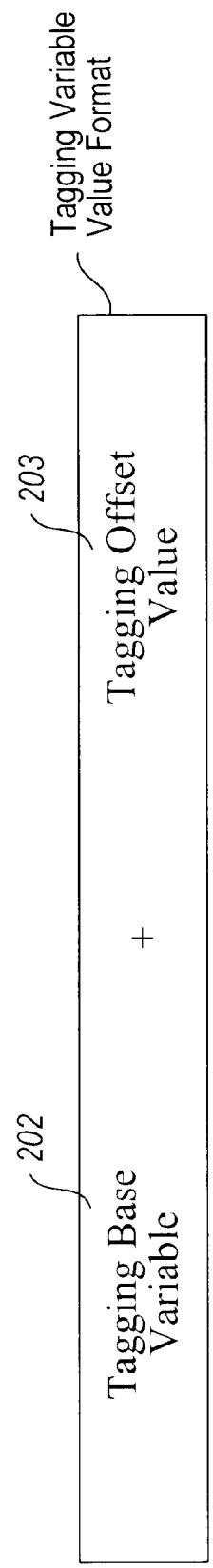
FIG. 2B illustrates the new tagging value provided by an exemplary embodiment of the present invention and consists of a tagging base variable plus a tagging offset value.

The unique tagging values are a combination of a tagging offset value and the value of the tagging base variable. In one exemplary embodiment, the tagging offset value for each source code module begins with a value of "0." The offset tagging instrumenter then increments the tagging offset value by 1 each time the offset tagging instrumenter inserts a new tagging assignment statement into the source code module. Thus, a source code module containing 10 tagging assignment statements would have a range of tagging offset values from 0 to 9 and a next tagging offset value of 10. The next tagging offset value indicates the tagging offset value, which would be used if another tagging assignment statement were to be inserted in the source code module. Each source code module has a unique base variable. In one exemplary embodiment, the value for the tagging base variable of the first module, as determined at link time, is 0. The value for the tagging base variable of the second module is the next tagging offset value of the first module plus the tagging base value for the first module. For example, if the next tagging offset value for the first module is 10, then the tagging base value for the second module would have a value of 10 (i.e., 10+0). The value for the tagging base variable for the third module is the next tagging offset value of the second module plus the tagging base value for the second module. For example, if the next tagging offset value for the second module is 12, then the tagging base value for the third module is 22 (i.e., 12+10). The tagging base value for any subsequent module equals the sum of the next tagging offset values for any preceding modules, or equivalently the sum of the preceding module's base value and next tagging offset value. In this manner, the resulting tagging value will be unique for each tagging assignment statement when the tagging offset value is added to the value of the tagging base variable. FIG. 2B illustrates the generating of a link-time relocatable tagging value. The tagging value is the sum of a tagging base variable 202 and a tagging offset value 203.

Figure 3:
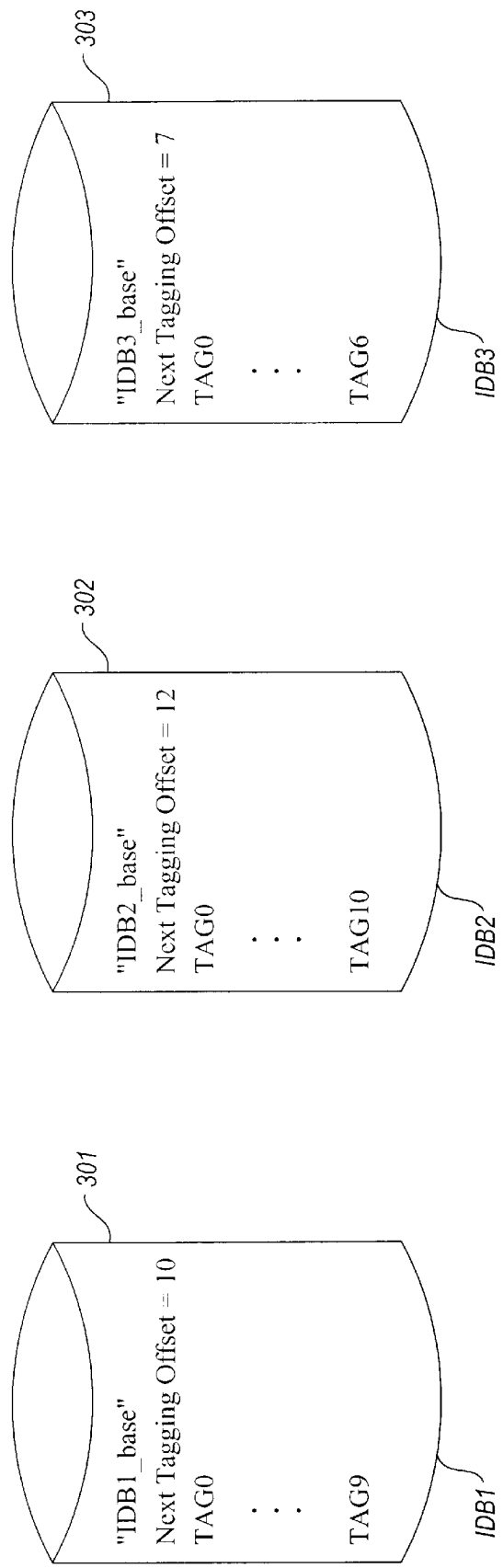
FIG. 3 depicts representative instrumentation databases associated with an embodiment of the present invention.

FIG. 3 illustrates sample IDBs associated with an exemplary embodiment the present invention. These IDBs contain the tagging values and other information necessary for instrumentation. Each IDB may represent one source code module. IDB1 301 contains data representing tagging points 0 through 9 for an instrumented source code module. This data includes the tagging offset value and location of each tagging point. IDB1 has a tagging base variable whose value, established at link-time by the tagging base value resolver, will be 0 and has a next tagging offset value of 10. The IDB includes the name of the tagging base variable so that a tagging base value resolver can locate the IDB associated with a given tagging base variable, and the tagging base variable serves to indicate that the IDB is of a type which includes link-time relocatable tags. The offset tagging instrumenter stores the data for the tagging points and the next tagging offset value. Likewise, IDB2 302 contains data representing 12 tagging points and a next tagging offset value of 12. Because IDB1 has a next tagging offset value of 10, the value of the tagging base variable eventually assigned to IDB2 by the tagging base value resolver is 10. Likewise, the tagging base value of IDB3 303 is 22 because the next tagging offset value for IDB1 is 10 and the next tagging offset value for IDB2 is 12 (e.g., unique values from 0 to 21 have already been selected for IDB1 and IDB2). Of course, as previously mentioned, the tagging base values are not be generated until the respective object code modules are linked to form executable code, and the unique tagging values themselves are not actually be generated until execution of each tagging assignment statement. In addition, in some embodiments of the invention, more than one tagging base variable may be stored in a given IDB, with each tagging base variable indicating a different type of tagging statement. However, such a tagging scheme is a mere extension of the scheme described herein.

Tables 4A, 4B, and 4C illustrate instrumented source code modules 1, 2, and 3, which respectively correspond to IDB1, IDB2 and IDB3 of FIG. 3. As shown at the top of the pseudocode representing instrumented source code module 1 in Table 4A, the offset tagging instrumenter has inserted a declaration statement for the tagging variable, which in this example is an external volatile unsigned long variable named "AMC_control_port" (ln. 3). The offset tagging instrumenter has also inserted a declaration for "IDB1_base" (ln. 4), the tagging base variable associated with IDB1 and source code module 1. The offset tagging instrumenter then examines the source code module and inserts tagging assignment statements at points of interest such as at line 9. This particular tagging assignment statement would alert the software developer of the execution of the call to function_1 (ln. 10). The tagging assignment statement, consisting of a tagging base variable plus a tagging offset value, inserted by the offset tagging instrumenter may also have a form similar to "AMC_control_port= tagging base variable+0x12345678." The offset tagging instrumenter continues tagging points of interest within this source code module until reaching its end. As indicated in Table 4A, the final tagging point within source code module 1 occurs at the very end of the source code module and is represented by a tagging assignment statement having a tagging value of IDB1_base plus a tagging offset value of 9 (ln. 27). The offset tagging instrumenter also inserts data related to these tagging assignment statements in IDB1 in the manner previously indicated.

Likewise, instrumented source code module 2, as shown in Table 4B, also includes the declaration statement for the tagging variable, "AMC_control_port" (ln. 3), and a declaration of the variable "IDB2_base" (ln. 4), which represents the tagging base variable for instrumented source code module 2. The offset tagging instrumenter then examines source code module 2, inserting tagging assignment statements into the source code module at various points of interest. For example, the tagging assignment statement represented by "AMC_control_port=IDB2_base+1" (ln. 11) when executed indicates that the "then" portion (ln. 9) of the "if" statement where "A≦12" (ln. 8) has been executed. More precisely, the location of this tagging assignment statement also indicates that the variable "A" has been assigned the value of "A−10" (ln. 12). The last tagging point in this source code module is "AMC_control_port=IDB2_base+11" (ln. 22). The offset tagging instrumenter will store data in the IDB2 indicating that source code module 2 has tagging assignment statements 0 through 11 and a next tagging offset value of 12.

Finally, the offset tagging instrumenter examines source code module 3, shown in Table 4C. Similarly to the previous two source code modules, the offset tagging instrumenter inserts the declaration for the "AMC_control_port" variable (ln. 3). The offset tagging instrumenter also inserts a declaration for the tagging base variable "IDB3_base" (ln. 4). The offset tagging instrumenter then proceeds tagging points of interest within this source code module by using a tagging assignment statement. The final tagging assignment statement, "AMC_control_port=IDB3_base+6" (ln. 10), occurs at the end of source code module 3.

TABLE 4A

| 1. | Instrumented Source Code Module 1 |
| --- | --- |
| 2. | |
| 3. | external volatile unsigned long AMC_Control_Port; |
| 4. | external unsigned long IDB1_base; |
| 5. | { |
| 6. |     A = 0; |
| 7. |     while (A ≧ 0) |
| 8. |     { |
| 9. |         AMC_Control_Port = IDB1_base + 0; |
| 10. |         function_1 (A,B); |
| 11. |         A = A + B; |
| 12. |     } |
| 13. |     AMC_Control_Port = IDB1_base + 1; |
| 14. |     if (A > 10) |
| 15. |         then |
| 16. |         { |
| 17. |             AMC_Control_Port = IDB1_base + 2; |
| 18. |         } |
| 19. |         else |
| 20. |         { |
| 21. |             AMC_Control_port = IDB1_base + 3; |
| 22. |         } |
| 23. |     AMC_Control_Port = IDB1_base + 4; |
| 24. |     . |
| 25. |     . |
| 26. |     . |
| 27. |     AMC_Control_Port = IDB1_base + 9; |
| 28. | } |

TABLE 4B

| | |
|---|---|
| 1. | Instrumented Source Code Module 2 |
| 2. | |
| 3. | external volatile unsigned long AMC_Control_Port; |
| 4. | external unsigned long IDB2_base; |
| 5. | { |
| 6. | A = X + 12; |
| 7. | AMC_Control_Port = IDB2_base + 0; |
| 8. | if (A ≦ 12) |
| 9. | then |
| 10. | { |
| 11. | AMC_Control_Port = IDB2_base + 1; |
| 12. | A = A - 10; |
| 13. | } |
| 14. | else |
| 15. | { |
| 16. | AMC_Control_Port = IDB2_base + 2; |
| 17. | } |
| 18. | AMC_Control_Port = IDB2_base + 3; |
| 19. | . |
| 20. | . |
| 21. | . |
| 22. | AMC_Control_Port = IDB2_base + 11; |
| 23. | } |

TABLE 4C

| | |
|---|---|
| 1. | Instrumented Source Code Module 3 |
| 2. | |
| 3. | external volatile unsigned long AMC_Control_Port; |
| 4. | external unsigned long IDB3_base; |
| 5. | { |
| 6. | AMC_Control_Port = IDB3_base + 0; |
| 7. | . |
| 8. | . |
| 9. | . |
| 10. | AMC_Control_Port = IDB3_base + 6; |
| 11. | } |

Figure 4:
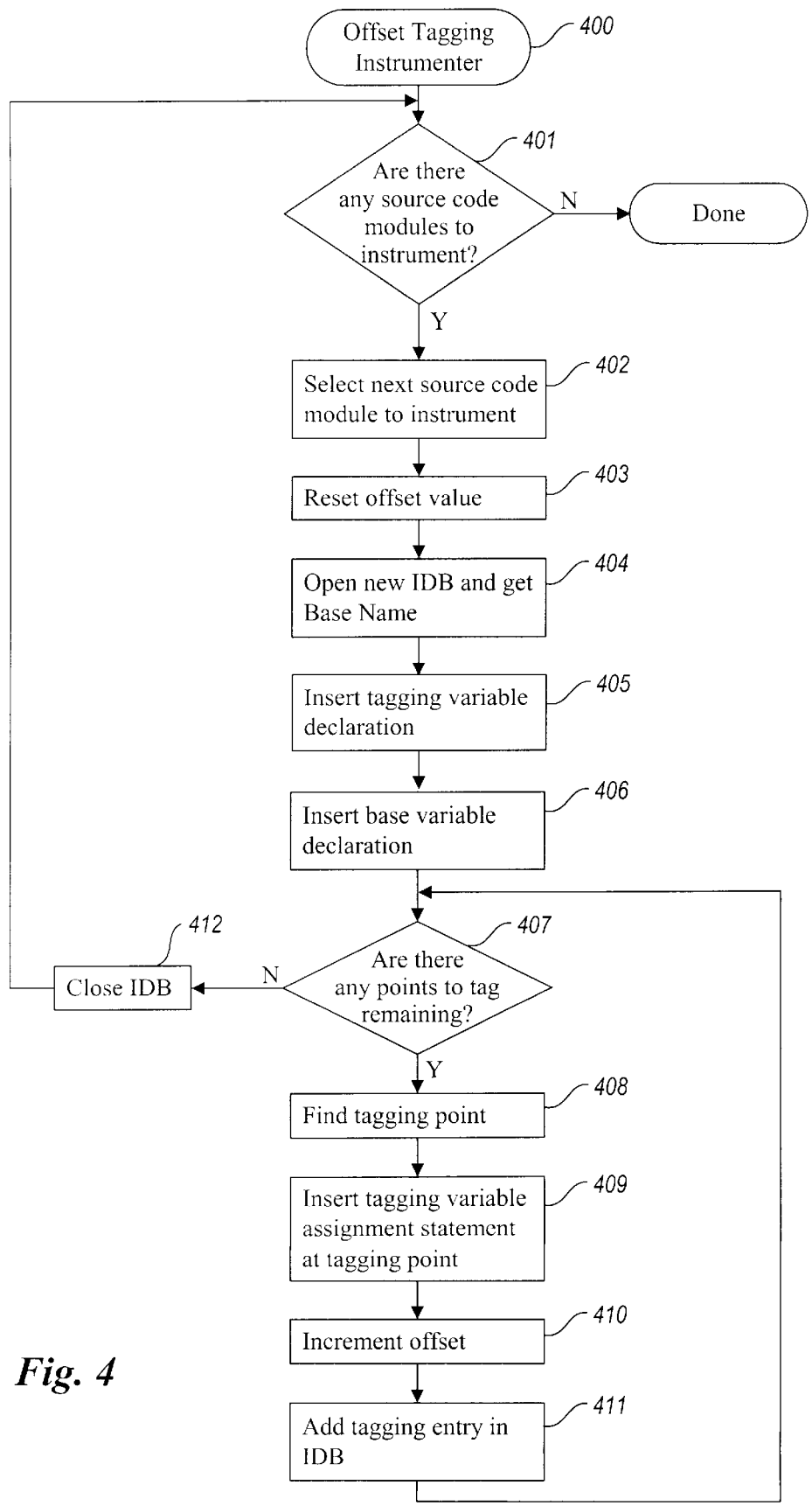
FIG. 4 provides a flow chart for the instrumentation of source code modules according to an embodiment of the present invention.

FIG. 4 provides a flow chart for the instrumentation of source code modules according to an exemplary embodiment of the present invention. The offset tagging instrumenter selects each source code module, inserts the declarative statements and tagging assignment statements into the selected module, and stores data in the IDB. First, the offset tagging instrumenter determines whether any more source code modules require instrumentation (step 401). When no more source code modules remain to be instrumented, the offset tagging instrumenter terminates. However, if there are still source code modules requiring instrumentation, the offset tagging instrumenter selects the next source code module to be instrumented (step 402). The offset tagging instrumenter then resets the tagging offset value to 0 (step 403). The offset tagging instrumenter opens a new instrumentation database and selects a name for this new IDB (step 404). The offset tagging instrumenter also uses this selected name to generate the name for a new tagging base variable to insert in the source code module to be instrumented. The offset tagging instrumenter then begins examining the source code module (steps 405–411). The offset tagging instrumenter inserts a declaration for the tagging variable into the source code module (step 405) and then inserts a declaration for the tagging base variable of this source code module (step 406). These declarations will resemble those illustrated in Tables 4A, 4B, and 4C for AMC_control_port, IDB1_base, IDB2_base, and IDB3_base. The offset tagging instrumenter then loops inserting the tagging assignment statements (steps 407–411). The offset tagging instrumenter determines if tagging points remain in the source code module (step 407). If tagging points remain, the offset tagging instrumenter locates the next tagging points within the source code module (step 408). Upon locating the next tagging point, the offset tagging instrumenter inserts a tagging assignment statement (step 409). This tagging assignment statement typically has the form "AMC_control_port= tagging base variable plus the current tagging offset value," as previously discussed. Following this step, the tagging offset value is then incremented by one (step 410). In addition, a tagging entry is made in the appropriate IDB (step 411). The tagging entry typically contains the tagging offset value for this tagging point, information about the source code at the tagging point, and the setting of the next tagging offset value to the incremented offset. The offset tagging instrumenter then loops (to step 407) to process the next tagging point. After instrumenting the source code module, the IDB for this source code module is closed (step 412). The offset tagging instrumenter then loops (to step 401) to determine whether other source code modules need to be instrumented.

As previously stated, the tagging base variables do not have their values assigned during the instrumentation procedure or during the compiling of the instrumented source code modules. Since the value of the tagging base variable is assigned at link time, only the link process needs to be centralized. This procedure thus supports a typical parallel compilation of new versions of the computer program. Similar to linking an executable computer program, an instrumentation linker in one embodiment contains a tagging base value resolver which resolves the value needed for each tagging base variable and the range of tagging values needed by each object code file such that no conflicts exist among the final tagging values. This process supports instrumentation of huge computer programs involving thousands of source code modules which may be compiled in parallel, saving enormous amounts of time. When the linking of the object code files occurs on a single computer, so does the instrumentation link process which finalizes the actual tagging values that will be assigned as the computer program executes. Thus, the variables IDB1_base, IDB2_base and IDB3_base, discussed above with regard to FIG. 3 and Tables 4A, 4B, and 4C, have no value fixed prior to the linking of the object code files representing the computer program. As shown in Table 5, the instrumentation linker prepares source code statements for the resolved tagging base variables which is then compiled and linked with the object code files for the instrumented source code modules. As shown in Table 5, the instrumentation linker prepares source code which sets the tagging base variable for IDB1, IDB1_base, to a value of 0 (ln. 3). Likewise, the tagging base variable for IDB2 (IDB2_base) will have a value of 10 (ln. 5), and the tagging base variable for IDB3 (IDB3_base) will have a value of 22 (ln. 7).

TABLE 5

| | |
|---|---|
| 1. | Instrumentation Linker: Base Variable Assignments |
| 2. | |
| 3. | const unsigned long IDB1_base = 0; |
| 4. | |
| 5. | const unsigned long IDB2_base = 10; |
| 6. | |
| 7. | const unsigned long IDB3_base = 22; |
| 8. | |

The tagging base value resolver can avoid certain tagging value ranges. This capability may simplify the instrumentation process for the software developer in a variety of different contexts, some of which are provided below.

First, the computer program may include a number of source code modules which rarely change, including legacy codes in forms such as source code module libraries. (Legacy code includes code which was instrumented with tagging assignment statements that set the tagging variable to a constant value and which are thus not compatible with the use of link-time relocatable tagging values.) The instrumentation procedure would obviously be more efficient if the software developer only needed to instrument such source code modules once so long as the modules are not modified.

Second, the software developer may simply wish to reserve a range of tagging values for a source code module which is not being instrumented using the offset tagging instrumenter. For example, a software developer may wish to instrument a particularly error-prone source code module by hand, inserting many more tagging assignment statements than would typically be inserted by an offset tagging instrumenter. In such a situation, the software developer may simply assign values to the inserted tagging assignment statements, then instruct the tagging base value resolver to avoid this range of tagging values when the tagging values are being resolved for other source code modules of this computer program.

Third, some source code modules may not have changed from one version of the computer program to the next. These source code modules may have previously been instrumented, and their respective tagging values may still be unique. Thus, the software developer may wish to pursue a more efficient course of action by simply instructing the tagging base value resolver to reserve the range of tagging values assigned to these previously instrumented and presently unchanged source code modules and only determine new tagging values for those source code modules which have changed and been re-instrumented in this latest version of the computer program.

Fourth, the third example above may be further supported by setting the next tagging offset value in one version of the computer program such that additional tagging assignment statements may be inserted in a later version of the computer program without requiring re-calculation of the tagging base variable. For example, as discussed above with regard to Table 4A, the next tagging offset value for instrumented source code module 1 can be set as low as 10 to ensure unique tagging values. However, if the next tagging offset value for instrumented source code module 1 was set to 12 instead of 10, then two additional tagging assignment statements could be inserted into source code module 1 in a later version of the computer program without requiring recalculation of any of the base variables (e.g., IDB2_base) while still ensuring unique tagging values for the computer program.

Fifth, some embodiments of the present invention may be structured such that during a first version of the computer program, the instrumentation linker not only determines the tagging base variables for the instrumented source code modules of the computer program but also determines the actual tagging values for each tagging assignment statement. (As discussed previously, the actual tagging value is typically determined as the computer program executes.) In this embodiment, the instrumentation linker then saves this range of actual tagging values, such as saving this range in the respective IDB for each instrumented source code module. In the instrumentation procedure for a later version of the computer program, the offset tagging instrumenter examines each instrumented source code module to determine if the instrumented source code module has changed from the previous version of the computer program. If a given source code module has not changed, then the offset tagging instrumenter retrieves the range of actual tagging values for the source code module and replaces the tagging assignment statements of the form "tagging variable equals base variable and tagging offset value" with tagging assignment statements of the form "tagging variable equals actual tagging value." Using these simpler tagging assignment statements for source code modules which are unchanged, allows their respective range of tagging values to be assigned during the compiling process rather than during execution of the computer program. Of course, for this embodiment to operate properly, the tagging base value resolver must be able to receive a range of reserved tagging values and avoid resolving any tagging base variable such that its respective range of tagging values will overlap the reserved tagging values.

Figure 5A:
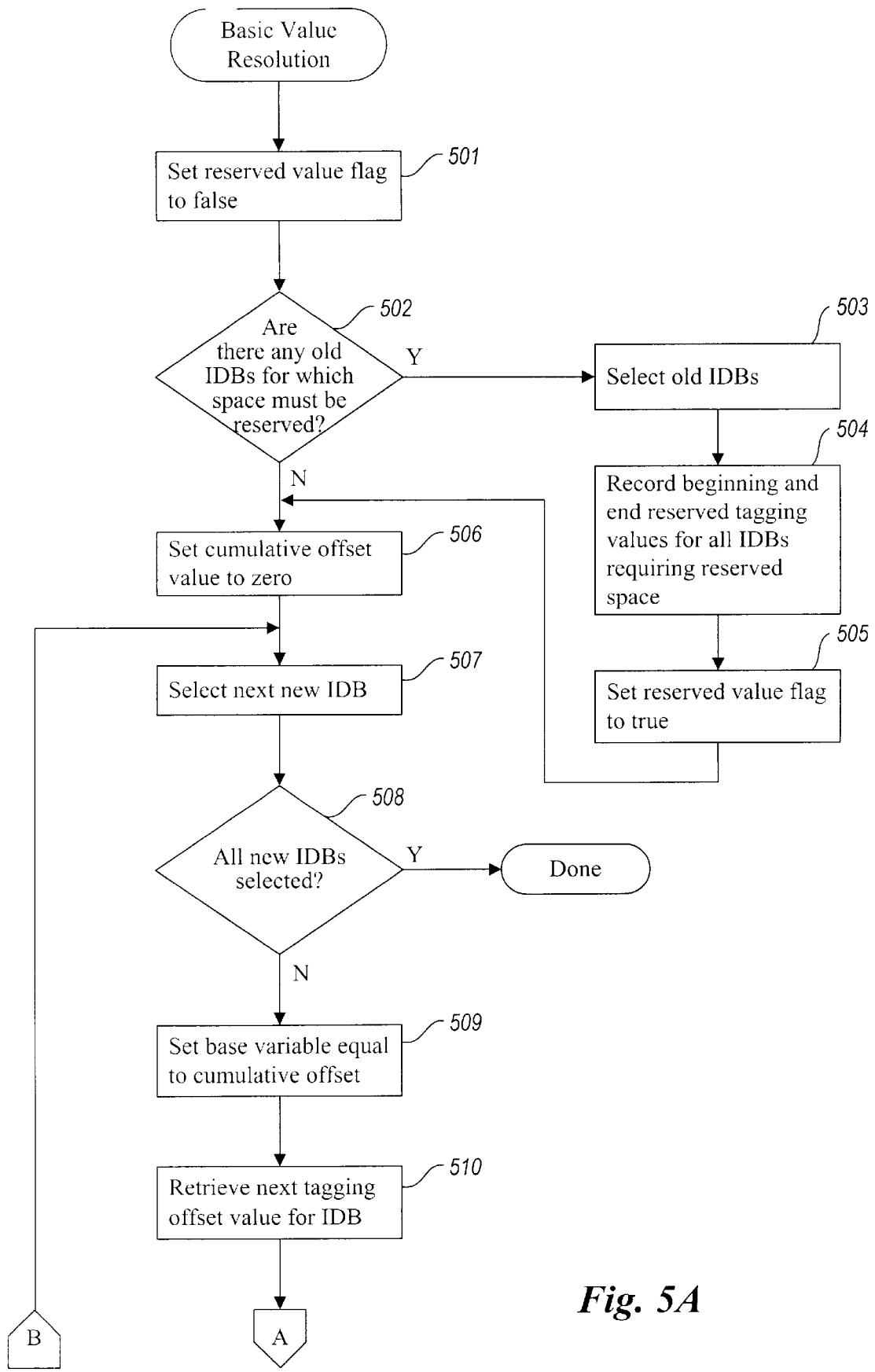
FIGS. 5A and B provide a flowchart for the tagging base variable value resolution procedure associated with an embodiment of the present invention.
Figure 5B:
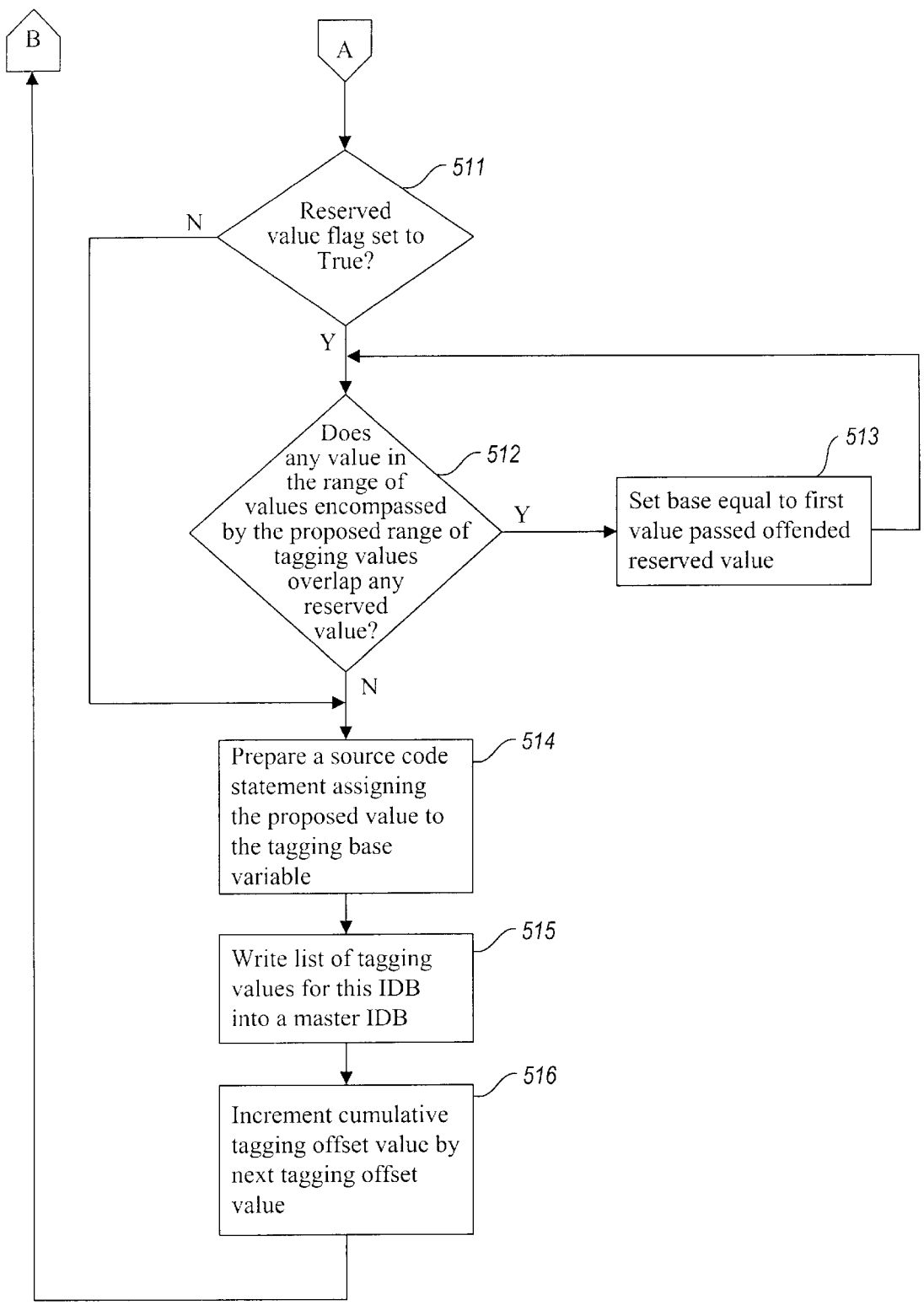

FIG. 5 provides a flowchart of the tagging base variable value resolution procedure for an embodiment of the present invention. This procedure selects each module and assigns a value for the tagging base variable of the selected module, ensuring that reserved ranges are avoided. As a first step, the procedure sets a reserved flag value to false end checks to determine if old IDBs will be linked in this version of the computer program (step 501). The presence of such old IDBs typically represents instrumented source code modules whose tagging values are not link time relocatable; For the reasons discussed above, these old IDBs already have tagging values assigned and merely require that space be reserved for the range of their tagging values. If old IDBs exist (step 502), then the procedure selects these old IDBs (step 503). The procedure makes a record of the range of tagging values to reserve for each IDB (step 504). The procedure sets the reserved flag value to true when old IDBs are present (step 505). The procedure continues until no more old IDBs remain for which space must be reserved. Once all the necessary space has been reserved, then the procedure sets a cumulative tagging offset value to zero (step 506). The procedure then loops assigning a tagging base value for each module that uses the link-time relocatable tagging values (steps 507–516). The procedure selects the next new IDB (step 507). If all of the new IDBs have already been selected, then the procedure terminates (step 508). Otherwise, the procedure sets the tagging base variable equal to the cumulative tagging offset value (step 509). The procedure then retrieves the next tagging offset value for this IDB (step 510). The procedure then checks the proposed value for the tagging base variable and the next tagging offset value for this IDB to determine if this proposed tagging value range conflicts with any of the reserved tagging values (steps 512). Of course, this step can skipped if the reserved value flag has never been set to true (step 511). If the proposed range is free of conflicts, then the tagging base value resolver then prepares a source code statement which assigns the proposed value to the tagging base variable (step 514). If a conflict would occur using the proposed value for the tagging base variable, then the tagging base value resolver selects another value for the tagging base variable such that the range of tagging values for this IDB does not conflict with the reserved range of tagging values (step 513). Once a value for the tagging base variable has been determined, then the tagging base value resolver stores the tagging values for this IDB in a master IDB which will eventually contain all the tagging values for the computer program and may be referenced by the workstation GUI (e.g., workstation GUI 108 of FIG. 1) during program execution(step 515). The procedure next increments the cumulative tagging offset value by the last retrieved next tagging offset value (step 516). The procedure then loops (to step 507) to select the next IDB. Thus, the tagging base value resolver may also create a master IDB which coalesces the information from all of the IDBs. This master IDB has the format of an old-style IDB (e.g., an IDB which does not contain the name of a tagging base variable). As an alternative embodiment, the tagging base value resolver could create an old-style IDB for each IDB after a value has been assigned to its tagging base variable.

Figure 6:
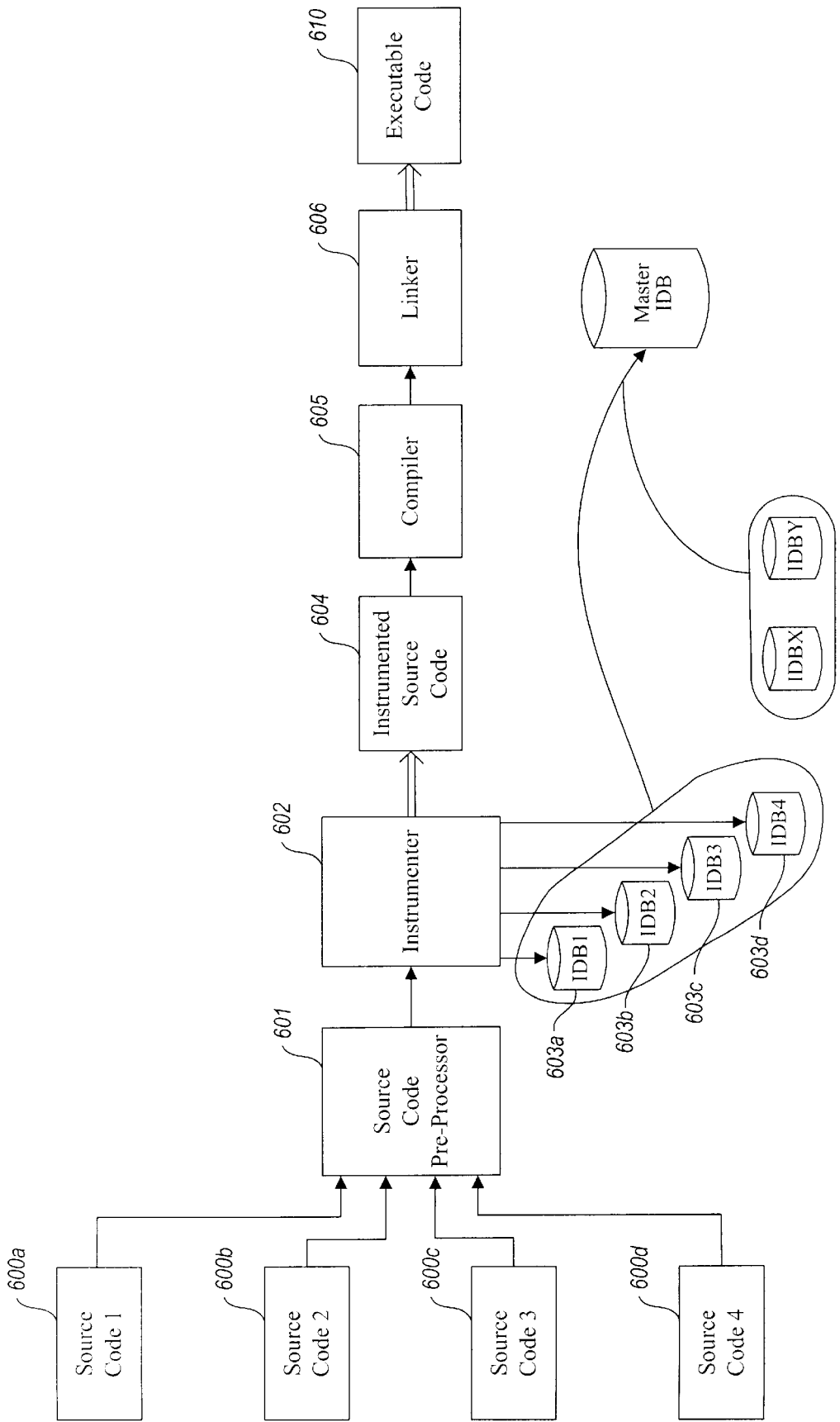
FIG. 6 illustrates an example instrumentation procedure associated with an embodiment of the present invention.

FIG. 6 provides an illustration of the instrumentation process of an exemplary embodiment of the present invention. Four source code modules 600a, 600b, 600c, and 600d represent the computer program prior to instrumentation. A source code preprocessor 601 removes comments and expands macros from these source code modules. An offset tagging instrumenter next examines the source code modules, looking for appropriate tagging points in the manner indicated by FIG. 4. The offset tagging instrumenter produces IDBs 603a, 603b, 603c, and 603d during its examination procedure. Typically, the offset tagging instrumenter will produce one IDB per source code module, as shown in FIG. 6. Alternatively, the data for multiple source code modules can be stored in one IDB. The offset tagging instrumenter will also produce instrumented source code module 604. In an alternative embodiment, the offset tagging instrumenter could produce an instrumented source code module for each source code module examined. The compiler 605 produces object code from the instrumented source code. The tagging base value resolver of linker 606 determines values for the tagging base variables in the manner such as that indicated by FIG. 5 and generates source code statements to initialize the tagging base variables. The generated source code statements are then compiled and linked with the compiled code to form the executable code 610. The resulting executable code 610 can then be used for testing the computer program.

Figure 7:
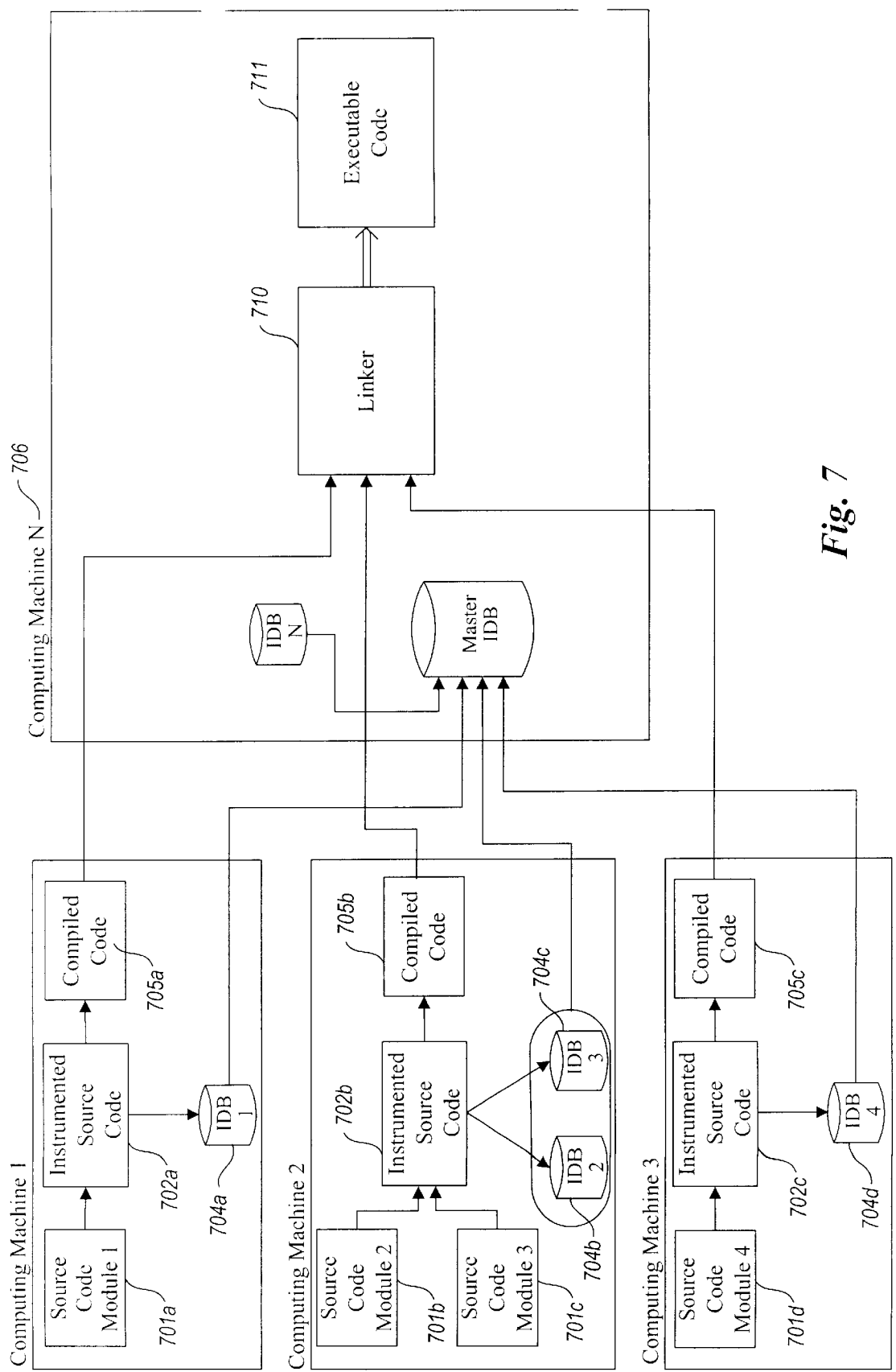
FIG. 7 illustrates an example instrumentation procedure associated with an embodiment of the present invention where the source code modules are instrumented on more than one computer.

FIG. 7 provides an illustration of an exemplary embodiment of the present invention where the source code modules are instrumented and compiled on more than one computer. A first source code module 701 a resides on computing machine 1. An offset tagging instrumenter 702a uses this source code module to produce IDB1 704a and compiled code 705a. In a similar manner, computing machine 2 holds two source code modules 701b and 701c. These source code modules are provided to offset tagging instrumenter 702b, resulting in the production of IDB2 704b and IDB3 704c as well as compiled code 705b. Similarly, on computing machine 3, offset tagging instrumenter 702c uses source code module 4 701d to produce IDB4 704d and compiled code 705c. Each of the object files representing the compiled code is provided to computing machine N 706. The computing machine N could be any appropriate computing machine and might even be one of the three previously mentioned computing machines. Likewise, all of the IDBs produced on the three computing machines are provided to computing machine N. The linker 710 uses the object code files produced on various computing machines to produce executable code 711. The tagging base value resolver of the linker resolves the values for the tagging base variables for each of the tagging values represented by the IDBs in the manner previously indicated so that the resulting executable code contains unique tagging values.

Figure 8:
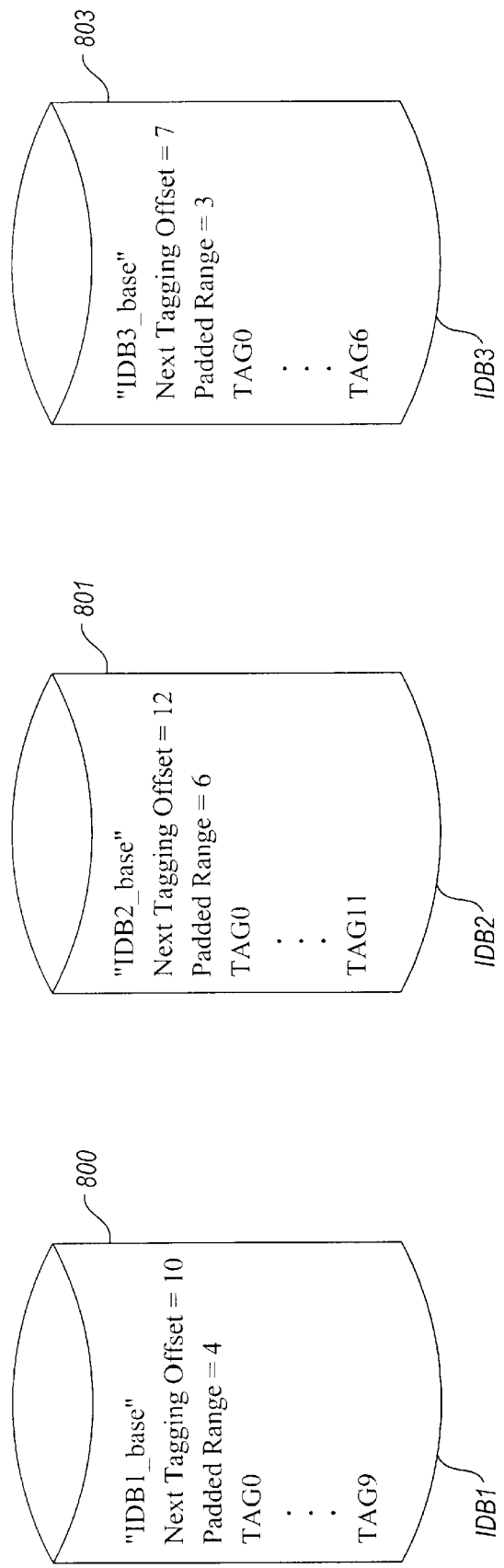
FIG. 8 shows an alternative embodiment for the IDBs used in the present invention.

Finally, FIG. 8 shows an alternative embodiment of the present invention. When the offset tagging instrumenter creates an IDB, a predetermined padding range can also be included. IDB1 800, IDB2 801, and IDB3 803 each have such a padding range included. This padding range allows additional tagging assignment statements to be inserted into a particular IDB without changing the maximum range of tagging values represented by that IDB. If a large computer program had all of its various source code modules previously instrumented and the software designer only added one new line of code to the first source code module, resulting in the addition of one more tagging assignment statement, then the value for the tagging base variable for this IDB and all the other IDBs would not change because this new tagging assignment statement would still be within the range provided by the padding values. Hence, this procedure enables a faster instrumentation and linking process.

Figure 9:
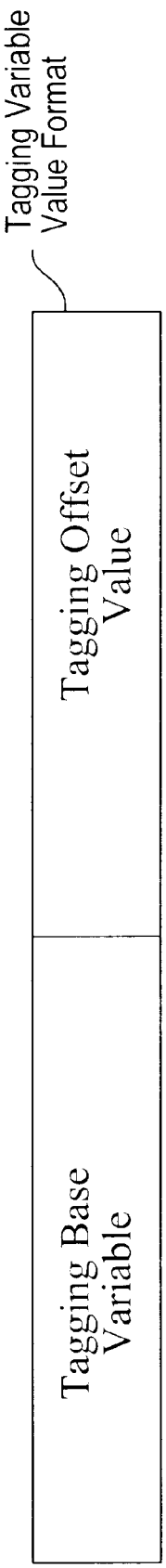
FIG. 9 illustrates an alternative embodiment for the tagging value provided by the present invention and consists of a tagging base variable concatenated with a tagging offset value.

FIG. 9 illustrates an alternative embodiment for the tagging value provided by the present invention and consists of a tagging base variable concatenated with a tagging offset value. The tagging values discussed above comprise a tagging base variable plus a tagging offset value. As an alternative embodiment, the tagging value comprises a tagging base variable concatenated to a tagging offset value. For example, a tagging value could comprise 64 bits. The first 32 bits could represent the tagging offset value, and the second 32 bits could represent the tagging base variable. In this embodiment, values for the tagging offset value and the tagging base variable could still be determined in the manner previously indicated. However, rather than adding the two values as discussed in the previous embodiments, the two values would now be concatenated. Thus, the linker would need only assign a unique tagging base value to each source code module and need not base the values on the number of tagging assignment statements in each source code module. Tagging values produced in this manner would still be unique and enable the computer programmer to trace the execution of the resulting computer program.

From the foregoing it will be appreciated that, although specific embodiments of the invention have been described herein for purposes of illustration, various modifications may be made without deviating from the spirit and scope of the invention. For example, if the linker is modified, then it may be possible to have the tagging values calculated at link time and to store the tagging values as constants that are assigned to the tagging variable by the tagging assignment statement. The compiler could output an indication of the location of each tagging assignment statement within the object code. The linker could then store a unique constant value in each tagging assignment statement and store the mappings from constant values to tagging points in an IDB. Also, the term module refers to any portion of a computer program, which may include a complete source code file, a portion of a source code file, a function, a procedure, or some other collection of statements that form the computer program. Accordingly, the invention is not limited except as by the appended claims.

What is claimed is:

1. A method in a computer system for instrumenting a computer program having a plurality of source code modules, the method comprising:

for each source code module,
generating a base variable having a name that is unique to the source code module;

for each instrumentation point in the source code module,
generating an offset value that is unique within the source code module to the instrumentation point; and inserting a tagging assignment statement at the instrumentation point, the tagging assignment statement for setting a tagging variable to a combination of the generated offset value and a value of the base variable; and compiling the instrumented source code module;

for each generated base variable, generating a source code statement that sets the base variable to a unique value such that combination of a generated offset value and of a value of base variable uniquely identifies each instrumentation point and the unique value of the tagging variable at each instrumentation point avoids a predetermined range of values;

compiling the generated source code statements; and linking the compiled instrumented source code modules with the compiled generated source code statements to form a linked program so that during execution of the linked program the tagging variable is set to a unique value at each instrumentation point.

2. The method of claim 1 further including inserting a declaration statement for the generated base variable in each source code module, the declaration statement indicating that the generated base variable is defined externally to the source code module.

3. The method of claim 1 further including inserting a declaration statement for the tagging variable in each source code module, the declaration statement indicating that the tagging variable is defined externally to the source code module.

4. The method of claim 1 further including storing the name of the generated base variable in an information data repository.

5. A system for instrumenting a computer program having a plurality of source code modules with a plurality of tagging assignment statements, each tagging assignment statement for specifying a unique value for a tagging variable by combining an offset value with a base value, the system comprising:

an offset tagging instrumenter which inserts tagging assignment statements into source code modules of the computer program and which generated the offset value for each tagging assignment statement; and a base value resolver which generates the base value for each source code module of the plurality of source code modules such that the value of the tagging variable is unique at each tagging assignment statement, wherein the base value resolver retrieves a range of previously assigned values for the tagging variable and determines the base value such that the value of the tagging variable at each tagging variable assignment statement avoids the range of previously assigned values for the tagging variable.

6. The system of claim 5 wherein the offset tagging instrumenter inserts at least one tagging variable assignment statement into a first source code module of the computer program residing on a first computer and inserts at least one other tagging variable assignment statement into a second source code module of the computer program residing on a second computer.

7. The system of claim 5 wherein the tagging offset instrumenter registers each tagging assignment statement in an instrumentation data repository.

8. A method for producing a plurality of unique values for a tagging variable used for instrumenting a computer program, the method comprising:

for each instrumentation point in the computer program, inserting a tagging assignment statement that sets the tagging variable to a value;

generating object code for the computer program with the inserted tagging assignment statements;

when object code of the computer program is linked to form executable code, adjusting the computer program so that each tagging assignment statement sets the tagging variable to a unique value, wherein the computer program includes a plurality of modules and the tagging assignment statement combines a tagging offset value with a tagging base value to generate the value such that the combination uniquely identifies each instrumentation point, and wherein a base value for each module is established when the computer program is adjusted.

9. The method of claim 8 wherein the tagging assignment statement combines a tagging offset value with a tagging base value.

10. The method of claim 8 wherein adjusting the computer program includes establishing the tagging base value.

11. The method of claim 8 wherein the tagging assignment statement sets the tagging variable to a constant value and wherein the adjusting of the computer program set the constant value for each tagging assignment statement to the unique value.

12. A method for instrumenting with tagging assignment statements a plurality of source code modules for a computer program to support testing of the computer program, the method comprising:

setting an offset value for a tagging assignment statement;

inserting the tagging assignment statement into a source code module that assigns a combination of the set offset values and a base value to a tagging variable; and setting the base value for the tagging assignment statement when object code representing the computer program is linked to form executable code, wherein the base value is resolved such that the value of the tagging variable in a tagging variable assignment statement is unique, wherein a highest value for the offset value in each source code module is set sufficiently large to provide for later insertion of a predetermined number of new tagging assignment statements such that the value of the tagging variable in all tagging assignment statements in the computer program will still be unique.

13. The method of claim 12 wherein the offset value for the tagging assignment statement is registered in an instrumentation data repository.

14. A computer-readable medium containing instructions for causing a computer system to produce a plurality of unique values for a tagging variable used for instrumenting a computer program, by:

for each instrumentation point in the computer program, inserting a tagging assignment statement that sets the tagging variable to a value;

generating object code for the computer program with the inserted tagging assignment statements;

when object code of the computer program is linked to form executable code, adjusting the computer program so that each tagging assignment statement sets the tagging variable to a unique value, wherein the computer program includes a plurality of modules the tagging assignment statement combines a tagging offset value with a tagging base value to generate the value such that the combination uniquely identifies each instrumentation point and wherein a base value for each module is established when the computer program is adjusted.

15. The computer-readable medium of claim 14 wherein the tagging assignment statement combines a tagging offset value with a tagging base value.

16. The computer-readable medium of claim 14 wherein the adjusting of the computer program includes establishing the tagging base value.

17. The computer-readable medium of claim 14 wherein the tagging assignment statement sets the tagging variable to a constant value and wherein the adjusting of the computer program set the constant value for each tagging assignment statement to the unique value.

\* \* \* \* \*